US000001079H

United States Statutory Invention Registration [19]

[11] Reg. Number: H1079

White et al. [43] Published: Jul. 7, 1992

[54] SUPERCONDUCTIVE POLARIZATION CONTROL NETWORK

[75] Inventors: Anthony W. White, Medway; Paul A. Ryan, Centerville, both of Ohio

[73] Assignee: The United States of America as represented by the Secretary of the Air Force, Washington, D.C.

[21] Appl. No.: 660,311

[22] Filed: Feb. 25, 1991

[51] Int. Cl.[5] ..... H01Q 21/06; H01Q 21/24

[52] U.S. Cl. ..... 342/361; 333/995

[58] Field of Search ..... 342/361; 333/22 F, 99 S

[56] References Cited

U.S. PATENT DOCUMENTS

| | | | |
|---|---|---|---|
| 3,781,647 | 12/1973 | Glaser . | |
| 3,878,529 | 4/1975 | Bozanic et al. . | |
| 4,006,418 | 2/1977 | Liskov et al. | 325/163 |
| 4,177,464 | 12/1979 | Masak | 343/100 |
| 4,258,436 | 3/1981 | Campbell | 375/10 |
| 4,717,894 | 1/1988 | Edwards | 332/20 |
| 4,737,793 | 4/1988 | Munson et al. | 342/361 |
| 4,806,888 | 2/1989 | Salvage et al. | 333/138 |

OTHER PUBLICATIONS

Ryan, High-Temperature Superconductivity for EW and Microwave Systems, Journal of Electronic Defense, May 1990, pp. 55-59.

*Primary Examiner*—Bernarr E. Gregory

*Attorney, Agent, or Firm*—Donald J. Singer; Bernard E. Franz

[57] ABSTRACT

Polarization Control Networks (PCNs) are used in active solid-state array transmitters. Polarization ECM requires precise polarization control of the transmitted signal. Prior polarization control networks (vector modulators) use ferrite phase shifters to achieve low loss and wide bandwidth, but because of their large size they must be placed before the RF power distribution network of the array. By implementing the polarization control networks in MMIC technology for each antenna element, and integrating each PCN with a 2-3 watt amplifier at its input, it is possible to eliminate half the required feed network and active amplifiers from the system. Each polarization control network unit includes a plurality of thin film superconducting phase shifters, hybrids and transmission lines enclosed in a cryogenic package. If more power is required than the superconductive PCN can accommodate, the amplifiers can be placed after the PCNs, and still maintain size and performance advantages over current implementations.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUPERCONDUCTIVE POLARIZATION CONTROL NETWORK

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a Superconductive Polarization Control Network (SPCN).

Current polarization control network (PCN) implementations are large. Ferrite phase shifters are used to control the relative amplitude and phase between the orthogonal polarization components of a transmitted RF signal because of their low impedance; however, ferrites are large and require that the entire PCN be placed before the signal distribution network of the array.

U.S. patents of interest include U.S. Pat. No. 4,843,351, to Edwards et al, which relates to vector modulation signal generation. U.S. Pat. No. 4,806,888 to Salvage et al relates to a monolithic vector modulator/-complex weight using parallel all-pass networks. Edwards et al U.S. Pat. No. 4,717,894 relates to calibration of vector modulators using a scalar detector. Masak U.S. Pat. No. 4,177,464 discloses use of vector modulators in connection with weighting of auxiliary antenna signals. Liskov et al U.S. Pat. No. 4,006,418 and Campbell U.S. Pat. No. 4,258,436 are also of interest.

SUMMARY OF THE INVENTION

An objective of the invention is to control polarization of RF signal transmissions, with reduced system size and power, and increased reliability.

The invention relates to a transmitting system for controlling phase and amplitude of RF signals supplied to orthogonal elements of an antenna array. There are a plurality of polarization control network units each having two ports coupled to orthogonally polarized elements of the antenna array, with a source of RF signals coupled via a RF distribution network to an input port of each polarization control network unit. Each polarization control network unit includes a plurality of thin film superconducting phase shifters, hybrids and transmission lines enclosed in a cryogenic package. Each polarization control network unit has an amplifier coupled between its input port and the RF distribution network.

If more power is required than the superconductive PCN can accommodate, the amplifiers can be placed after the network, and still maintain size and performance advantages over current implementations.

ADVANTAGES AND NEW FEATURES: There are a number of advantages of using superconductivity in the array just before signal transmission (FIG. 3), only half the corporate feed network and active amplifiers of the previous configuration are needed. This reduces system size and power. System reliability is also increased because the previous ferrite network is a single point failure but the superconductive network can be implemented in each transmission path. GaAs could be used instead of superconductive materials but each phase shifter would have as much as 16 dB loss. To get the required effective radiative power (ERP) from the array, large amplifiers would be needed to compensate for these losses. The added power and heat would well exceed GaAS' capabilities.

DETAILED DESCRIPTION

The invention is disclosed in a paper by Paul A. Ryan entitled "High-Temperature Superconductivity for EW and Microwave Systems", in the Journal of Electronic Defense, May, 1990, which is hereby incorporated by reference.

Figure 1:
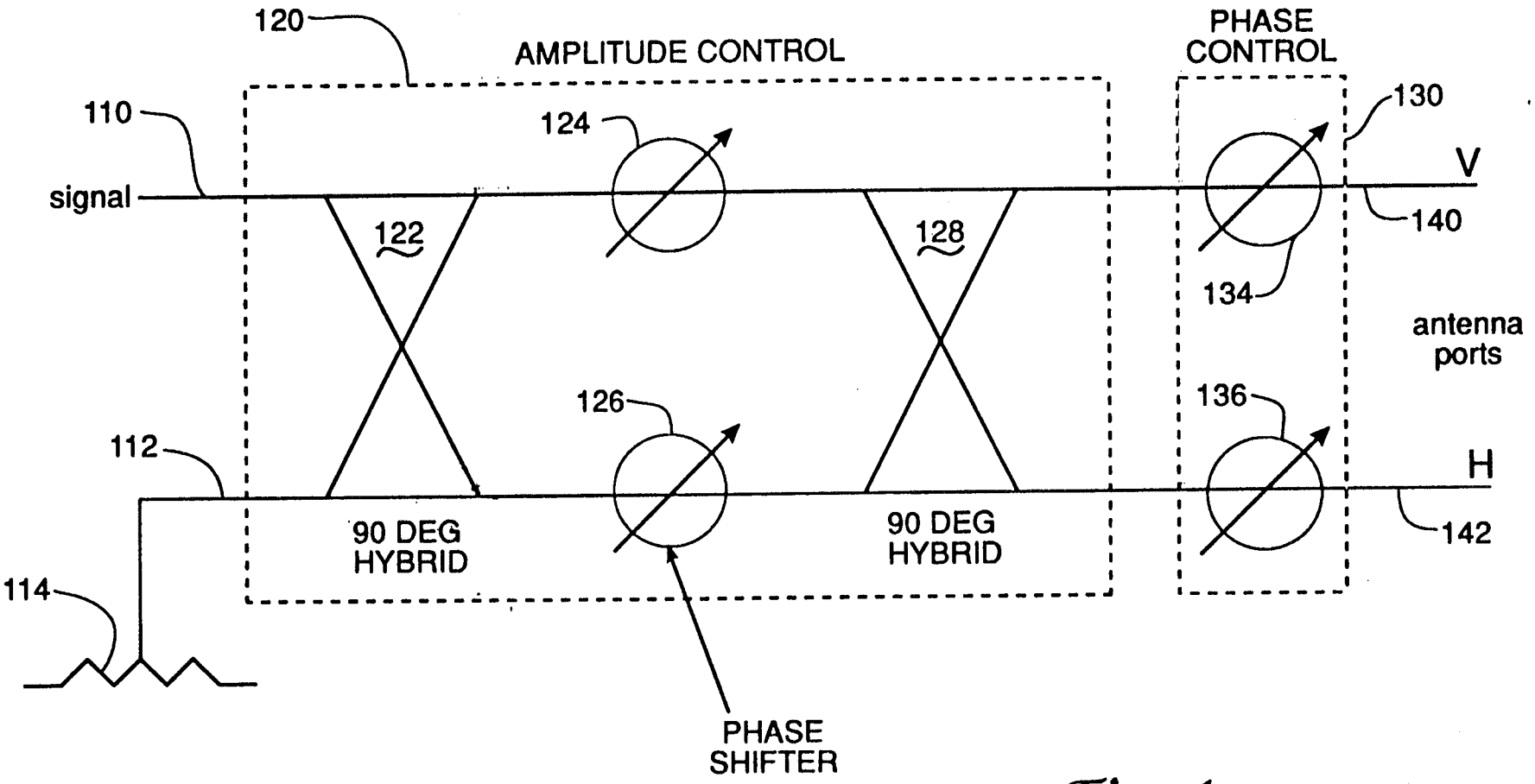
FIG. 1 is a schematic diagram of a polarization control network.

A schematic diagram of a typical Polarization Control Network (PCN) (or Vector Modulator) is shown in FIG. 1. It comprises an amplitude control section 120 and a phase control section 130. The amplitude control section comprises two phase shifters 124 and 126 coupled between two 90 degree hybrids 122 and 128. The phase control section comprises two phase shifters 134 and 136 coupled to ports of the hybrid 128. The hybrid 122 has a port 110 coupled to an RF signal line, and another port 112 coupled to a termination resistance 114. The phase shifter 134 is coupled to a vertical antenna port 140, and the phase shifter 136 is coupled to a horizontal antenna port 142. Drivers (not shown) are coupled to the phase shifters to determine the amplitude and phase of the signals supplied to the antenna ports.

Current polarization control network (PCN) implementations are large. Ferrite phase shifters are used to control the relative amplitude and phase between the orthogonal polarization components of a transmitted RF signal because of their low impedance; however, ferrites are large and require that the entire PCN be placed before the signal distribution network of the array, as shown in FIG. 2.

Figure 2:
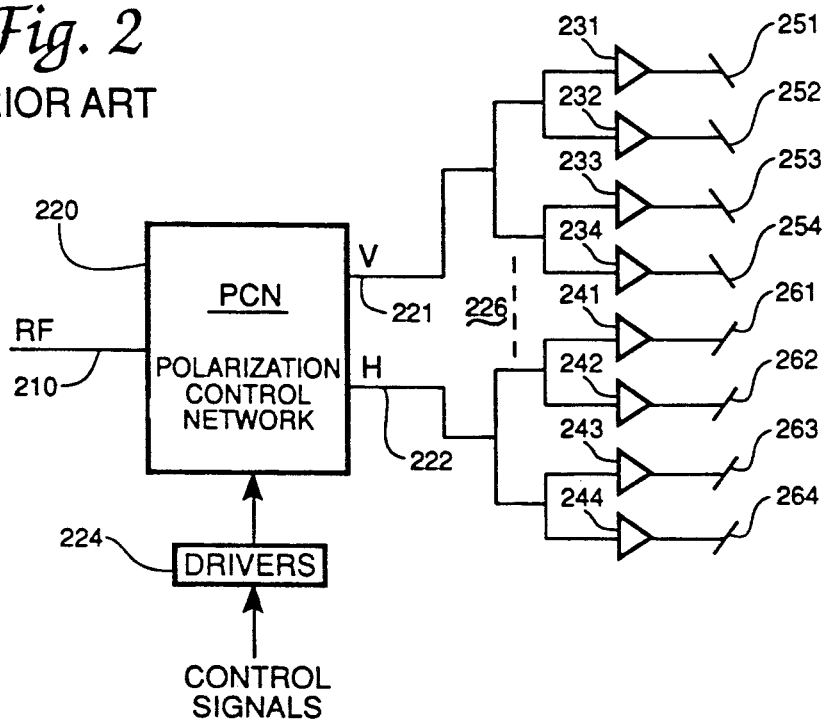
Fig. 2 PRIOR ART
FIG. 2 is a block and schematic diagram of a prior art system using a polarization control network (PCN), for feeding an antenna array.

In the prior art system shown in FIG. 2, the PCN 220 may be of the type shown in FIG. 1, with ferrite phase shifters. Control signals are supplied to the phase shifters via drivers 224. RF signals from the vertical port 221 are supplied via half of the distribution network 226 via amplifiers 231, 232, 233, 234 to the antenna as represented by elements 251, 252, 253, 254, respectively; and RF signals from the horizontal port 222 are supplied via the other half of the distribution network 226 via amplifiers 241, 242, 243, 244 to the antenna as represented by elements 261, 262, 263, 264, respectively. The portion of the antenna represented as elements 251, 252, 253, 254 is orthogonal to the portion represented as elements 261, 262, 263, 264. Note that the distribution network 226 comprises UHF or microwave transmission lines with power divider devices at each junction.

A sheet included with this patent application, from Texas Instruments, Defense Systems & Electronics Group, has a diagram like FIG. 1, with a circulators at the port 110 for coupling from an exciter and to a receiver, and also a circulator at the port 112 to a termination resistance and another terminal. Its listed features are:

Provides precise relative amplitude and phase difference between signals at the array polarization ports.

Relative amplitude and phase controlled to within 0.025 dB and 0.05 degrees, respectively.

Ferrite phase shifters used in the amplitude and phase control networks because of their low insertion loss and broad bandwidth.

Vector modulator reciprocalized using look up table.

Update rate is presently limited to 25 kHz.

Size: 12.8×11.8×4.7 in.

Weight: 13 lb.

Superconductivity allows extremely small, thin film phase shifters and transmission lines to be fabricated with negligible microwave insertion loss. Using thin film superconducting phase shifters, hybrids and transmission lines, the network can be significantly reduced in size. A system using PCNs of this type is shown in FIG. 3.

High temperature superconductors (HTSC) include yttrium, bismuth and thallium ceramic compounds. For microwave and millimeter waves, using superconducting stripline or microstrip technology gives the low-loss performance of waveguide but at a much smaller size, weight and cost. Well known stripline or microstrip devices may be modified by using the HTSC compounds in thin film devices, including hybrids and phase shifters.

Figure 3:
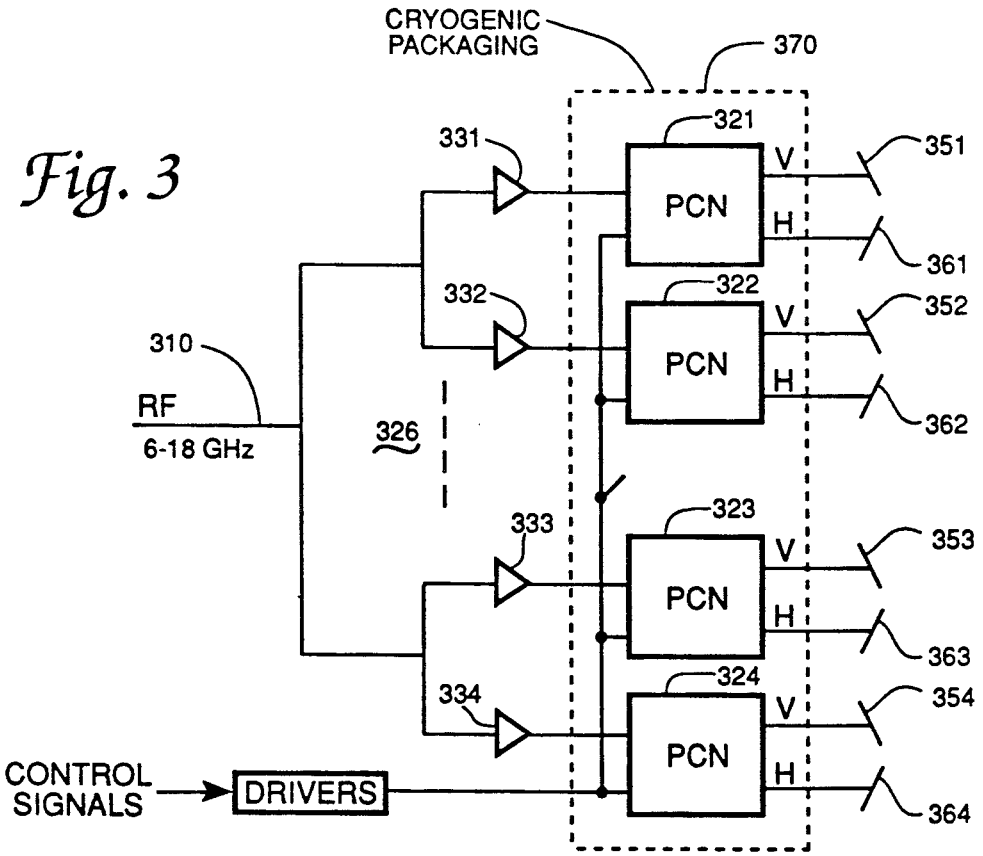
FIG. 3 is a block and schematic diagram of a system according to the invention using superconductive PCNs after the RF power feed network, with an amplifier before each PCN.

In FIG. 3, RF signals from line 310 are supplied via the RF distribution network 326 the PCNs 321, 322, 323, 324 via amplifiers 331, 332, 333, 334 respectively. The RF signals from the vertical ports of the PCNs are supplied to the antenna as represented by the elements 351, 352, 353 354 respectively; and the RF signals for orthogonal polarization from the horizontal ports are supplied to the antenna as represented by the elements 361, 362, 363 364 respectively.

There are a number of advantages of using superconductivity in the array just before signal transmission (FIG. 3), only half the corporate feed network and active amplifiers of the previous configuration are needed. This reduces system size and power. System reliability is also increased because the previous ferrite network is a single point failure but the superconductive network can be implemented in each transmission path.

Figure 4:
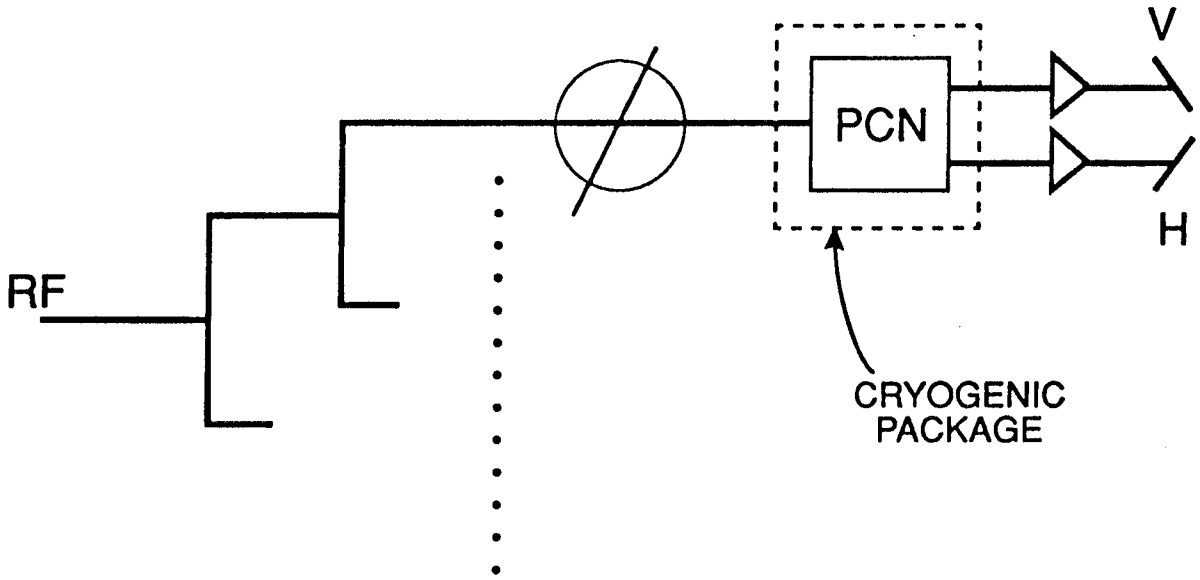
FIG. 4 is a block and schematic diagram of an alternative system using superconductive PCNs after the RF power feed network, with amplifiers following the PCNs.

If more power is required than the superconductive PCN can accommodate, the amplifiers can be placed after the network, as shown in FIG. 4, and still maintain size and performance advantages over current implementations.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A transmitting system for supplying RF signals to an orthogonally polarized antenna array, comprising a plurality of polarization control network units each having two orthogonally polarized ports (V and H) coupled to the orthogonally polarized antenna array, with a source of RF signals coupled via a RF distribution network to an input port of each polarization control network unit;

wherein each polarization control network unit includes thin film superconducting devices enclosed in a cryogenic package.

2. A transmitting system according to claim 1, wherein each polarization control network unit has an amplifier coupled between its input port and the RF distribution network.

3. A transmitting system according to claim 1, wherein each polarization control network unit has an amplifier coupled between each of said two orthogonally polarized ports and the antenna array.

4. A transmitting system for supplying RF signals to an orthogonally polarized antenna array, comprising a plurality of polarization control network units each having two orthogonally polarized ports (V and H) coupled to the orthogonally polarized antenna array, with a source of RF signals coupled via an RF distribution network to an input port of each polarization control network unit;

wherein each polarization control network unit includes first and second quadrature hybrids, each having first and second input ports and first and second output ports, with the first input port of the first quadrature hybrid coupled to the RF distribution network, the second input port of the first quadrature hybrid coupled to termination means, a first phase shifter coupled between the first output port of the first quadrature hybrid and the first input port of the second quadrature hybrid, a second phase shifter coupled between the second output port of the first quadrature hybrid and the second input port of the second quadrature hybrid, a third phase shifter coupled between the first output port of the second quadrature hybrid and the orthogonally polarized antenna array, and a fourth phase shifter coupled between the second output port of the second quadrature hybrid and the orthogonally polarized antenna array, wherein said quadrature hybrids and phase shifters are thin film superconducting devices enclosed in a cryogenic package.

* * * * *